US006505211B1

(12) United States Patent
Dessloch et al.

(10) Patent No.: US 6,505,211 B1
(45) Date of Patent: Jan. 7, 2003

(54) METHOD FOR PROVIDING FOR PERSISTENCE OF JAVA CLASSES WHERE THE PERSISTENCE SEMANTICS MAY BE ORTHOGONAL TO THE CLASS DEFINITION

(75) Inventors: Stefan Dessloch, San Jose, CA (US); Steven K. Elliot, Sunnyvale, CA (US); Saileshwar Krishnamurthy, San Jose, CA (US); Rajendra B. Panwar, San Jose, CA (US); Dirk Wollscheid, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/488,305

(22) Filed: Jan. 20, 2000

Related U.S. Application Data

(60) Provisional application No. 60/117,241, filed on Jan. 26, 1999.

(51) Int. Cl.[7] .............................................. G06F 17/30
(52) U.S. Cl. .................. 707/103; 707/104; 707/10; 707/4
(58) Field of Search ................... 707/103, 104, 707/102, 101, 10, 2, 3, 100, 4; 717/100, 1, 5; 709/202, 218, 229

(56) References Cited

U.S. PATENT DOCUMENTS

| | | | |
|---|---|---|---|
| 5,161,225 A | 11/1992 | Abraham et al. | |
| 5,247,669 A | 9/1993 | Abraham et al. | |
| 5,291,593 A | 3/1994 | Abraham et al. | |
| 5,295,256 A | 3/1994 | Bapat | |
| 5,613,099 A | 3/1997 | Erickson et al. | |
| 5,729,739 A | 3/1998 | Cantin et al. | |
| 5,737,597 A | 4/1998 | Blackman et al. | |
| 5,737,598 A | 4/1998 | Blackman et al. | |
| 5,752,249 A | 5/1998 | Macon, Jr. et al. | |
| 5,764,979 A | 6/1998 | Blackman et al. | |
| 5,784,620 A | 7/1998 | Isham | |
| 5,809,506 A | 9/1998 | Copeland | |
| 5,809,508 A | 9/1998 | Blackman et al. | |
| 5,809,509 A | 9/1998 | Blackman et al. | |
| 5,854,896 A | 12/1998 | Brenner et al. | |
| 5,864,866 A | 1/1999 | Henckel et al. | |
| 5,920,725 A | * 7/1999 | Ma et al. | 707/203 |
| 6,163,776 A | * 12/2000 | Periwal | 707/101 |
| 6,199,195 B1 | * 3/2001 | Goodwin et al. | 707/100 |
| 6,330,709 B1 | * 12/2001 | Johnson et al. | 717/100 |

OTHER PUBLICATIONS

Seiter et al., "Evolution of Object behavior using Context Relations", ACN, 1996, pp. 46–57.*
B. Liskov et al. (1996) "Safe and Efficient Sharing . . . Thor," ACM SIGMOD pp. 318–329.
Voyager/C++, Client/Server Object Management System (1995) Secant Technologies Inc.
K.J. Muckenhaupt (1996) "Preserving Current Assets With Objects on MVS White Paper".
M. Jordan et al. (1996) "Applications Supported by an . . . System," OOPSLA pp. 1–12.
A. Saljoughy (1997) "Object Persistence and Java," Java World pp. 1–8.
M. Jordan et al. (1998) "Orthogonal Persistence for Java . . . Report," Sun Microsystems Laboratories.

* cited by examiner

*Primary Examiner*—Jean M. Corrielus
(74) *Attorney, Agent, or Firm*—Gates & Cooper LLP

(57) ABSTRACT

A method, apparatus, and article of manufacture for providing for persistence of Java™ objects. A Java™ object is instantiated from its corresponding Java™ class definition and then loaded into a Java™ virtual machine. The class definition corresponding to the Java™ object can be derived using either the Java™ Reflection API. Once the class definition is derived, it can be used to inspect the contents of the Java™ object. A structured type instance is then generated from the inspected contents of the Java™ object, wherein the structured type instance is stored in a column of a table of a relational database managed by a relational database management system. As a result of these steps, the Java™ object is persistently stored in the database, yet the persistence semantics for storing the object are not specified as part of the class definition of the object, which means that the persistence semantics are orthogonal to the class definition.

78 Claims, 10 Drawing Sheets

METHOD FOR PROVIDING FOR PERSISTENCE OF JAVA CLASSES WHERE THE PERSISTENCE SEMANTICS MAY BE ORTHOGONAL TO THE CLASS DEFINITION

CROSS-REFERENCE TO RELATED APPLICATIONS

This application claims the benefit under 35 U.S.C §119 (e) of co-pending and commonly-assigned U.S. Provisional application serial No. 60/117,241, entitled "SCHEME FOR PERSISTENCE OF JAVA CLASSES, WHERE THE PERSISTENCE SEMANTICS MAY BE ORTHOGONAL TO THE CLASS DEFINITION," filed on Jan. 2, 1999, by Stefan Dessloch and Saileshwar Krishnamurthy, which application is incorporated by reference herein.

BACKGROUND OF THE INVENTION

1. Field of the Invention

The present invention relates generally to the implementation of Java™ classes, and in particular, to a method for providing for persistence of Java™ classes where the persistence semantics of the Java™ classes may be orthogonal to the class definition.

2. Description of Related Art

It is well known in the art to use object-oriented programming techniques with relational database management systems, such as IBM's Database 2 (DB2™) Universal Database (UDB™) relational database management system. Currently, there is a need to store objects in such a database, in order to provide persistence of the objects.

However, existing approaches for persistence of objects of a Java™ class have required one of the following:

1. The Java™ class implements the Serializable or Externalizable interfaces defined as part of the Java™ language specification.

2. The Java™ class implements the SQLData interface defined as part of the Java™ Database Connectivity (JDBC) 2.0 Extensions, which is one of the standard Application Programming Interfaces (API) of the Java™ Language Specification.

3. A special non-standard virtual machine execution environment which implements more than the standard Java™ virtual machine (JVM) specification, which would be a model for "true orthogonal persistence", where objects that are still "live" automatically survive without any code that explicitly instructs them to do so.

Using one of approaches (1) and (2) mentioned above is feasible when the user of the Java™ class is also its author. In the real world, however, programmers often reuse general-purpose Java™ classes that are distributed by third parties, and have neither the authority to modify such classes, nor the source code of the classes themselves. Even if the user can modify the Java™ class, it is desirable to have persistence as a property that is independent of the class definition and usage, i.e., as an orthogonal property.

The "almost ideal" situation of approach (3) above is infeasible because it requires a special non-standard execution environment that describes something more than the Java™ language itself.

The problem of persistent programming languages has been a topic for research in the programming language community for the last 15 years. There have been various approaches proposed over the years, but they can all be placed in one of two categories:

1. The persistence semantics are tied into the definition of the programming language type, i.e., by implementing special interfaces or by inheriting such semantics from special superclasses. In the Java™ case, this corresponds to approaches (1) and (2) mentioned above with regard to existing approaches. However, this does not provide the semantics of orthogonal persistence.

2. The underlying programming language is changed by building the semantics into the execution environment for interpretive languages or by training the compiler for compiled languages. In either situation, the result is semantics that will work only in very restricted cases. For the Java™ language, this corresponds to approach (3) mentioned above with regard to existing approaches. With Java™, it is absolutely necessary for the code to run in any standard Java™ environment, and so this is infeasible.

Thus, there is a need in the art for new approaches for providing persistence for Java™ objects.

SUMMARY OF THE INVENTION

To overcome the limitations in the prior art described above, and to overcome other limitations that will become apparent upon reading and understanding the present specification, the present invention discloses a method, apparatus, and article of manufacture for providing for persistence of Java™ objects. A Java™ object is instantiated from its corresponding Java™ class definition and then loaded into a Java™ virtual machine (JVM). The class definition corresponding to the Java™ object can be derived using the Java™ Reflection Application Programming Interface (API). Once the class definition is derived, it can be used to create a structured type in a relational database management system (RDBMS) that corresponds to the Java™ class (where fields in the Java™ class map to attributes in the structured type). The class definition can be used with the Java™ Reflection API to inspect the contents of the Java™ object. An instance of a structured type is then generated from the inspected contents of the Java™ object, wherein the instance is stored in a column of a table of a relational database managed bathe RDBMS. As a result of these steps, the Java™ object is persistently stored in the database, yet the persistence semantics for storing the object are not specified as part of the class definition of the object, which means that the persistence semantics are orthogonal to the class definition.

Various advantages and features of novelty, which characterize the invention, are pointed out with particularity i n the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention describes a method for providing persistence for an object instantiated from a class definition, so that the object persists beyond its execution. More specifically, the persistence semantics are not specified as part of the class definition. This concept is termed "orthogonal persistence".

The approach of the present invention to achieve orthogonal persistence of arbitrary Java™ objects is to provide a method that derives a class definition for a Java™ object, and then uses the class definition to inspect the contents of the Java™ object. The method may use the Java™ Reflection Application Programming Interface (API) provided as part of the standard Java™ Language Specification.

The larger context of the present invention describes how such Java™ objects can be stored in an object-relational database that implements a Basic Object Package (BOP) of the SQL99 standard for relational database management systems (RDBMS). Java™ classes can be mapped to structured types that are defined in such databases, and the objects are made to persist in columns of tables defined on such types.

Hardware and Software Environment

Figure 1:
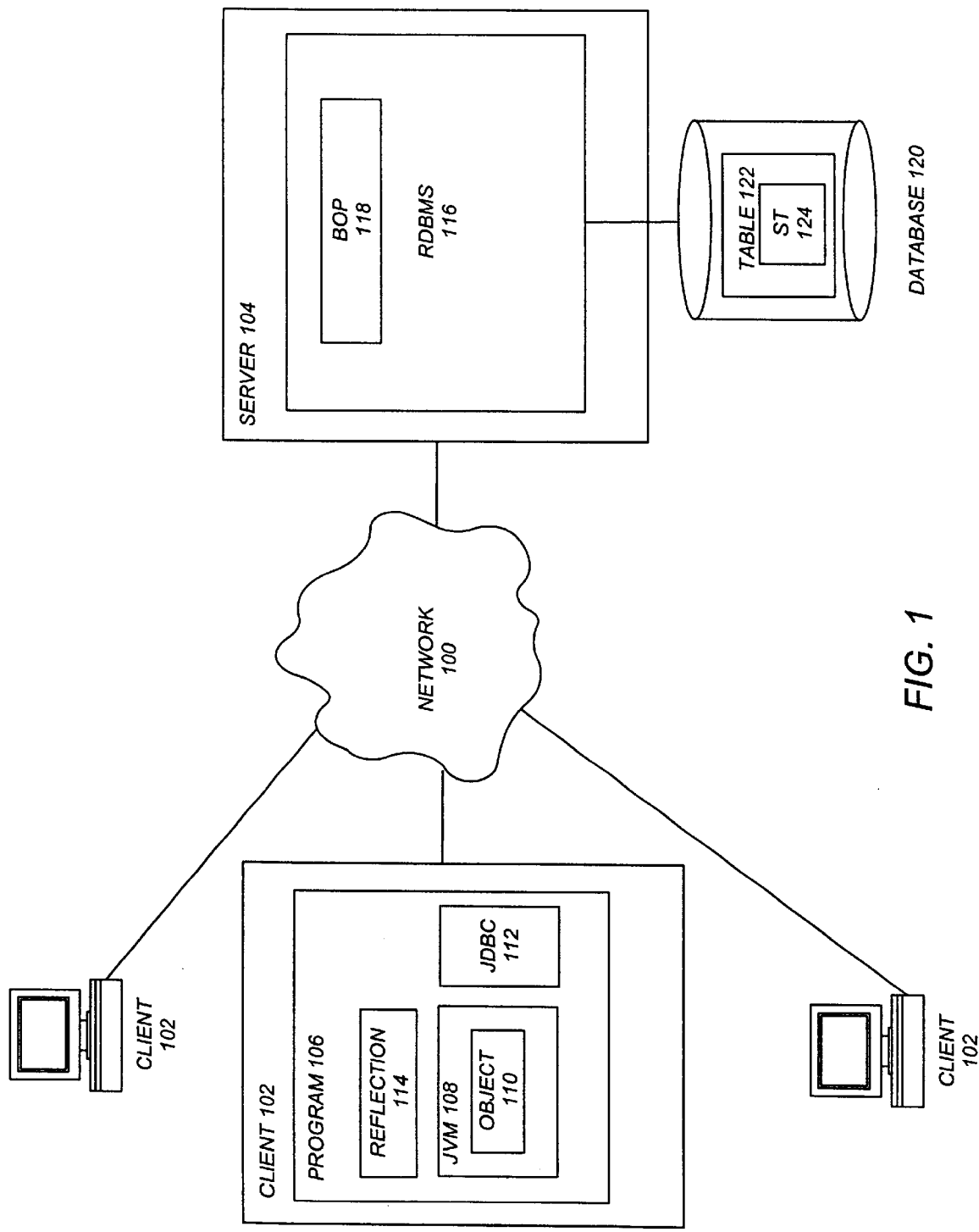
FIG. 1 is a block diagram illustrating an exemplary hardware and software environment used to implement the preferred embodiment of the invention.

FIG. 1 is a block diagram illustrating an exemplary hardware and software environment used to implement the preferred embodiment of the invention. A network 100 interconnects one or more client computers 102 and server computers 104. Both the client computers 102 and the server computer 104 are typically comprised of one or more processors, random access memory (RAM), read-only memory (ROM), and other components such data storage devices and data communications devices.

At least one of the client computers 102 executes a client program 106 that includes a Java™ virtual machine (JVM) 108 for executing Java™ objects 110 (also known as instantiated Java™ classes). The JVM 108 also executes objects that implement a Java™ Database Connectivity (JDBC) 2.0 driver 112 and a Java™ Reflection API 114.

The server computer 102 executes a Relational Database Management System (RDBMS) 116 that includes a Basic Object Package (BOP) 118, and which accesses a database 120 that includes one or more tables 122 that store one or more structured type instances 124. In the preferred embodiment, the structured types are defined in Java™ class definitions.

All of these various components 108–124 interact to provide the functions of the preferred embodiment of the present invention. Moreover, these various components 108–124 each comprise logic and/or data that are tangibly embodied in or retrievable from a device, medium, carrier, or signal, e.g., a memory, a data storage device, a data communications device, or other device, etc. Moreover, this logic and/or data, when read, executed, and/or interpreted by a computer, causes the computer to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" as used herein is intended to encompass logic and/or data embodied in or accessible from any device, carrier, or media.

Those skilled in the art will recognize that any combination of the above components, or any number of different components, including different computers, peripherals, devices, logic, and/or data, may be used to implement the present invention, so long as similar functions are performed thereby.

Java™ Database Connectivity

The Java™ Database Connectivity (JDBC) 2.0 driver 112 provides a standardized programming-level interface for communicating with database management systems, such as RDBMS 116, in order to access databases, such as relational database 120. The JDBC driver 112 is based on the X/Open SQL Call Level Interface.

Generally, the JDBC driver 112 includes interfaces for generating transactions with the database 120, including (but not limited to) the following interfaces:

java.sql.Environment—allows the creation of new database 124 connections;

java.sql.Connection—connection-specific data structures;

java.sql.Statement—container class for embedded SQL statements;

java.sql.ResultSet—access control to results of a statement; and java.sql.SQLData—custom mapping of structured type instances 124.

These interfaces are designed to interact with specific functions of the RDBMS 120.

As mentioned above, SQLData is used for the custom mapping of structured type instances 124. It includes the following methods:

getSQLTypeName( )—Returns the fully-qualified name of the structured type instance 124 that is represented by this object.

getSQLType( )—Returns the type of the structured type instance 124 that is represented by this object.

readSQL(SQLInput stream, String typeName)—Populates this object 110 with data read from the database 120.

writeSQL(SQLOutput stream)—Writes this object 110 to the database 120.

SQLInput is an input stream that contains a stream of values representing an instance of a structured type instance 124. When the method getObject is called with an object 110 of a class implementing the SQLData interface, the JDBC driver 112 calls the method SQLData.getSQLType to determine the SQL type of the structured type instance 124 being mapped. The JDBC driver 112 creates an instance of SQLInput, populating it with the attributes of the structured type instance 124. The JDBC driver 112 then passes the input stream to the method SQLData.readSQL, which in turn calls one or more of the SQLInput.readXXX methods in its implementation for reading the attributes from the input stream.

SQLOutput is an output stream for writing the attributes of a structured type instance 124 back to the database 120. When an object 110 of a class implementing the SQLData interface is passed as an argument to an SQL statement, the JDBC driver 112 calls SQLData.getSQLType to determine the kind of SQL datum being passed to the database 120. The JDBC driver 112 then creates an instance of SQLOutput and passes it to the method SQLData.writeSQL. The method writeSQL in turn calls one or more of the appropriate SQLOutput.writeXXX methods to write data from the SQLData object 110 to the SQLOutput output stream as the representation of a structured type instance 124.

The JDBC driver 112 also implements a Serializable interface that allows object 110 serialization to save and restore the entire state of the object 110. The Java™ language specification defines the Serializable interface that a class can implement, so that its entire state can be saved and restored.

The writeObject method is responsible for writing the state of the object 110 for its particular class to an ObjectOutputStream, so that the corresponding readObject method can restore the object 110. The class of each serializable object 110 is encoded including the class name and signature of the class, the values of the fields and arrays in the object 100, as well as any references to other objects 110. The readObject method is responsible for reading and restoring the state of the object 110 for its particular class using data from the corresponding ObjectInputStream. The state of an object 110 is restored by reading data from the ObjectInputStream and making assignments to the appropriate fields of the object 110.

Java™ Reflection API

The Java™ Reflection API 114 gives Java™ objects 110 the ability to perform dynamic introspection, i.e., the ability to examine the classes of loaded objects 110. Fundamentally, the Java™ Reflection API 114 is comprised of two components: objects 110 that represent the various parts of a class definition, and a means for extracting those objects 110 in a safe and secure way. The Java™ Reflection API 114 is symmetric, which means that an object 110 can be queried about its internals, or the internals of an object 110 can be queried about the class that declared it. One use of the Java™ Reflection API 114 is for determining the interdependencies between a given class and the rest of the system.

Mapping Java™ Classes to Structured Type Instances

Figure 2:
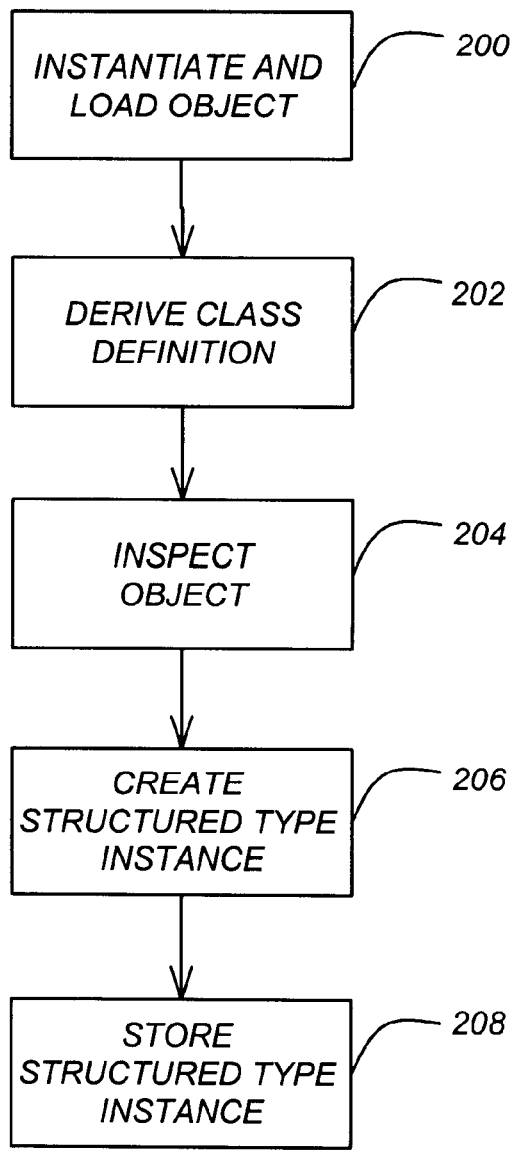
FIG. 2 is a flowchart that illustrates the general logic of the preferred embodiment of the present invention.

FIG. 2 is a flowchart that illustrates the general logic of the preferred embodiment of the present invention. Specifically, this figure describes a method for providing for the orthogonal persistence of Java™ classes.

Block 200 represents the client 102 instantiating a Java™ object 110 from a class definition and then loading the Java™ object 110 into the JVM 108.

Block 202 represents the client 102 deriving the class definition corresponding to the Java™ object 110. The derivation of the class definition can be accomplished using the Java™ Reflection API 114.

Block 204 represents the client 102 inspecting the contents of the object 110 using the derived class definition.

Block 206 represents the client 102 generating a structured type instance 124 from the contents of the Java™ object 110.

Block 208 represents the client 102 interfacing with the JDBC driver 112 to store the structured type instance 124 into a column of a table 122 of the relational database 120 managed by the RDBMS 116, so that the object 110 persists beyond its execution.

As a result of these steps, the object 110 is persistently stored in the database 120, yet the persistence semantics for storing the object 110 are not specified as part of the class definition of the object 110. Tis means that the persistence semantics are orthogonal to the class definition.

The present invention provides several techniques for mapping classes to structured type instances 124, so that the objects 110 can be stored in the database 120. Each of these techniques is described in more detail below.

(1) SQLData Interface: For Java™ Classes that can be Modified

A Java™ class that can be modified by a user can be mapped into a corresponding structured type, by implementing the SQLData interface of the JDBC driver 112. The actual mapping involves defining structured types for each Java™ class, so that each field of the Java™ class has a corresponding attribute in the structured type. The readSQL and writeSQL methods of the Java™ class are implemented using the various readInt, readString, readFloat methods of SQLInput.

Figure 3A:
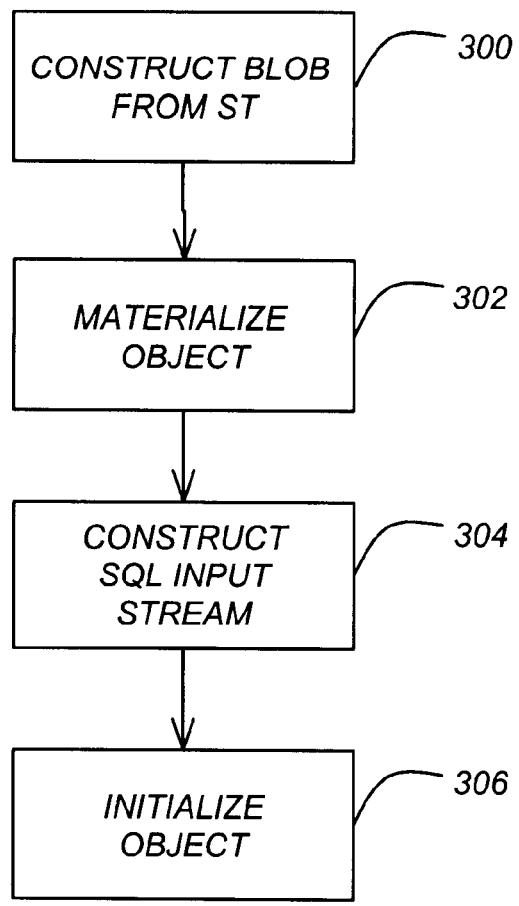
FIGS. 3A and 3B, 4A and 4B, 5A and 5B, and 6A and 6B are each a flowchart that illustrates the logic performed while the data is being bound-out from or bound-in to an RDBMS according to various embodiments of the present invention.

FIG. 3A is a flowchart that illustrates the logic performed during bind-out according to the preferred embodiment of the present invention. In the bind-out case from the RDBMS 116 to the JVM 108, a FROM_SQL built-in transform of the RDBMS 116 constructs an ObjectStream BLOB (Binary Large Object) that represents a structured type instance 124, and passes it to the JDBC driver 112 (Step 300). The ObjectStream is the format of the BLOB that is produced and consumed by the FROM_SQL and TO_SQL built-in transforms, respectively.

The JDBC driver 112 reads type information from the ObjectStream to materialize the appropriate Java™ class definition as an object 110 (Step 302), constructs a SQLInputStream from the remaining byte stream (Step 304), and calls the readSQL method of the corresponding class definition to initialize the object 110 from the SQLInputStream (Step 306).

Figure 3B:
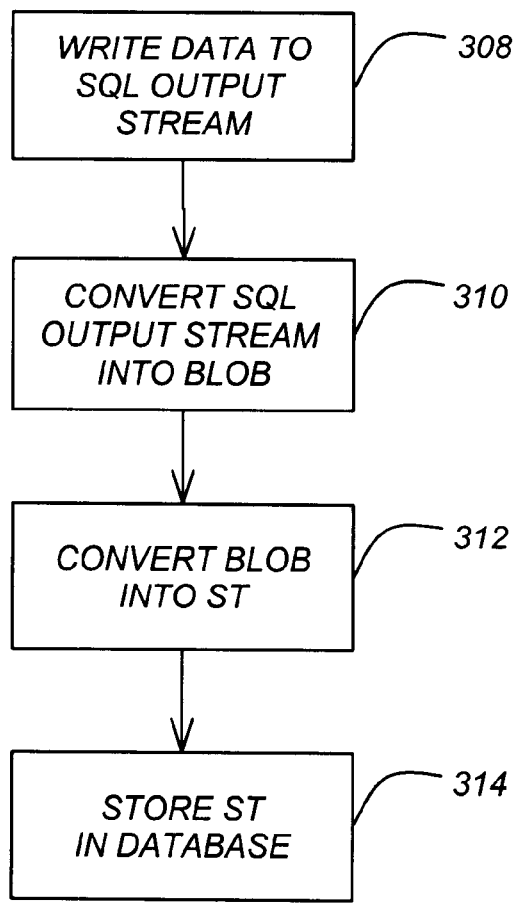

FIG. 3B is a flowchart that illustrates the logic performed during bind-in according to the preferred embodiment of the present invention. The bind-in is essentially the reverse of the bind-out. In the bind-in case from the JVM 108 to the RDBMS 116, the writeSQL method of the class is used by the object 110 to write the data into a SQLOutputStream constructed from a binary stream which has appropriate header information (Step 308). The JDBC driver 112 then goes on to convert the binary stream in the SQLOutputStream into a BLOB (Step 310). The JDBC driver 112 then inserts the BLOB into the database 120 via the RDBMS 116, by means of a TO_SQL built-in transform function of the RDBMS 116 that converts the BLOB into a structured type instance 124 (Step 312) and stores it into a specified table 122 of the database 120 (Step 314).

(2) For Java™ Classes that cannot be Modified and do not Implement SQLData

This technique is used for classes that cannot be modified, perhaps because they reside in libraries bought from third-party vendors. Assume that an attempt is being made to map a Java™ class called JavaClass to a structured type instance 124 type called STNAME. A number of approaches are available, as described below.

(2.1) Use Java™ Serialization for Java° Classes that Implement "Serializable"

(2.1.1) Data Exchange Between the RDBMS and Client is in JavaSerialized Format

This approach involves serializing the contents of the object 110 and storing the serialzed contents as a BLOB in the database 120. The Java™ class definition is then mapped to a structured type that is a subtype of a special structured type (known as SysJavaSerialized) that is always defined for the system. The definitions for these types are as below:

CREATE TYPE SYSJAVASERIALIZED AS (CONTENT BLOB(2G)) MODE DB2SQL;

CREATE TYPE SCHEMANAME.STNAME UNDER SYSJAVASERIALIZED INSTANTIABLE WITHOUT COMPARISONS NOT FINAL MODE;

The ObjectStream is extended to indicate the format of the structured type instance 124 (essentially marking it, if it is a subtype of SYSJAVASERIALIZED), i.e., either STRUCT or JavaSerialized.

Figure 4A:
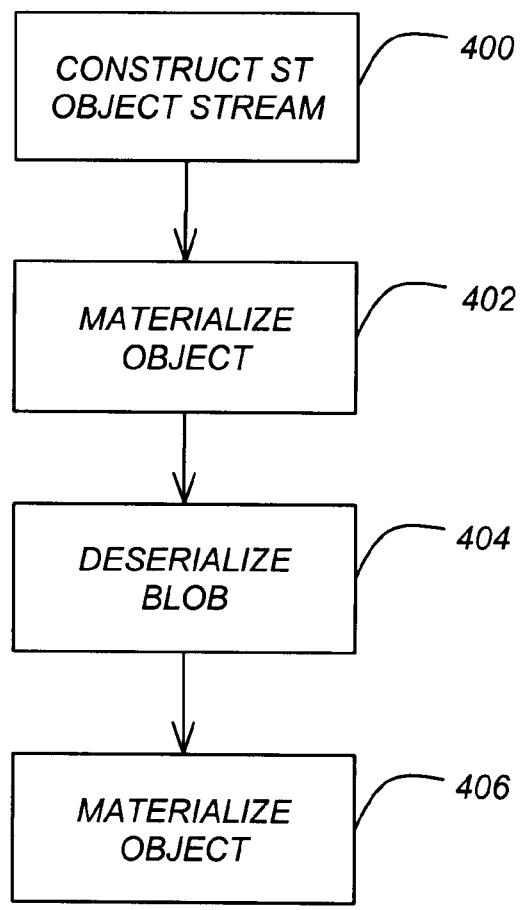

FIG. 4A is a flowchart that illustrates the logic performed during bind-in according to the preferred embodiment of the present invention. During bind-out from the RDBMS 116 to the JVM 108, the FROM_SQL built-in transform function of the RDBMS 116 constructs an ObjectStream (that represents an instance of SCHEMANAME.STNAME), and passes it to the JDBC driver 112 (Step 400). The JDBC driver 112 reads type information from the ObjectStream to materialize the appropriate Java™ class as an object 110 (Step 402), and uses Java™ deserialization (the readObject( ) method) on an ObjectInputStream representing the "content" BLOB field of the ObjectStream (Step 404) to materialize the Java™ object 110 encoded in the "content" field (Step 406).

Figure 4B:
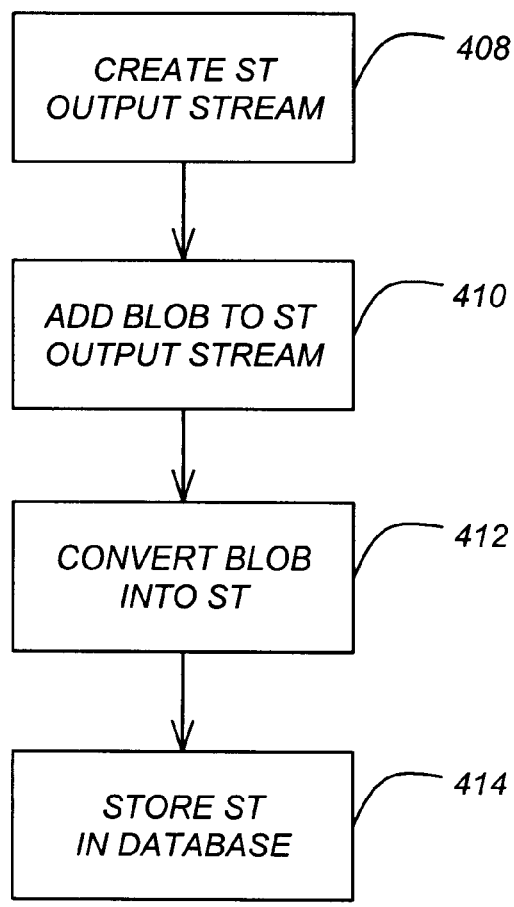

FIG. 4B is a flowchart that illustrates the logic performed during bind-in according to the preferred embodiment of the present invention. During bind-in from the JVM 108 to the RDBMS 116, the JDBC driver 112 creates an ObjectStream BLOB with the appropriate headers (Step 408), and uses Java™ serialization (the writeObject( ) method of the stream) on an ObjectOutputStream that creates a "content" BLOB, which is then written after the header into the ObjectStream BLOB (Step 410). The JDBC driver 112 then inserts this BLOB into the database 120, where the TO_SQL built-in transform function of the RDBMS 116 converts it into a structured type instance 124 (Step 412), and then stores the structured type instance 124 into a specified table 122 in the database 120 (Step 414).

The advantage of this approach is that only a few modifications need be made in the JDBC driver 112 to achieve this functionality. The disadvantage of this approach is that such structured type instances 124 can only be accessed through Java™ User-Defined Functions (UDFs) (where they need to perform Java™ deserialization) or through the JDBC driver 112. Also, the system-generated accessor functions for the structured type cannot access the fields of the Java™ object as they are encapsulated opaquely into the BLOB attribute of the structured type (this is the attribute called "content"). However, considering that these represent Java™ classes 110 bought from third party vendors, i.e., classes 110 that cannot be modified by the user, it is questionable if this is a problem.

(2.1.2) Data Exchange Between the RDBMS and Client is in ObjectStream Format

This approach involves mapping a Java™ class 110 to a structured type instance 124 in the exact same way as described above in conjunction with Java™ classes 110 that implement the SQLData interface. Since the RDBMS 116 now has no knowledge that a structured type instance 124 represents a Java™ class 110, it is exchanged between the client 102 and the server 104 in the ObjectStream format, again exactly as for classes 110 that implement SQLData. Of course, the Java™ class 110 does not have the readSQL and writeSQL methods of SQLData (or any of its other methods).

On the client 102 side, two classes 110 need to be implemented: SQLObjectInputStream and SQLObjectOutputStream These classes 110 implement the ObjectInput and ObjectOutput interfaces of Java™ serialization, on byte streams in the ObjectStream format. For example, calling a writeInt( ) method of this class 110 will write an integer preceded by the appropriate meta-flag as defined in the ObjectStream format.

Alternatively, the SQLInputStream and SQLOutputStream classes can implement the ObjectInput and ObjectOutput interfaces respectively. On the server 104, bind-out and bind-in take place exactly as for structured type mapped to classes 110 that implement SQLData.

Figure 5A:
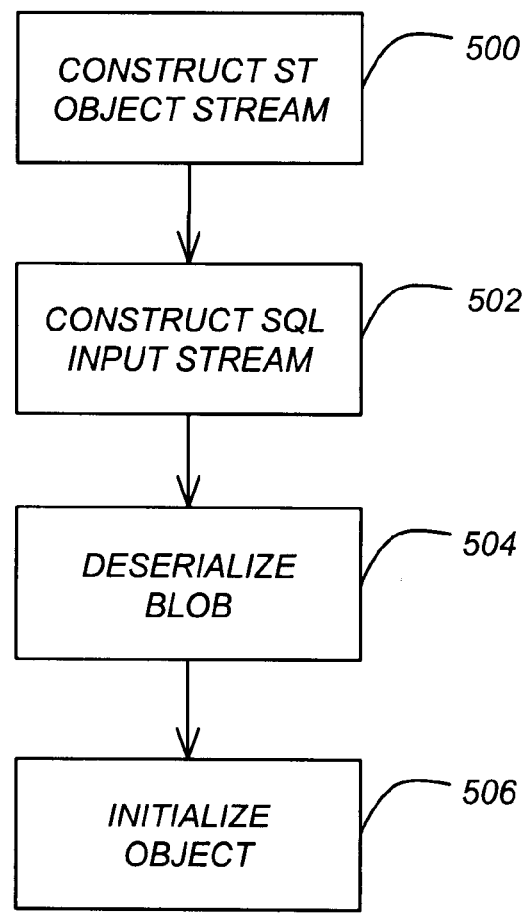

FIG. 5A is a flowchart that illustrates the logic performed during bind-out according to the preferred embodiment of the present invention. During bind- out, the FROM_SQL built-in transform function of the RDBMS 116 constructs an ObjectStream BLOB that represents a structured type instance 124, and passes it to the JDBC driver 112 (Step 500). The JDBC driver 112 reads type information from the ObjectStream, determines that the corresponding Java™ class 110 does not implement the SQLData interface, and constructs a SQLObjectInputStream object 110 with the remainder of the ObjectStream, i.e., BLOB (Step 502). The JDBC driver 112 uses the Java™ deserialization interface with the SQLObjectInputStream object 110 (Step 504) and then initializes the Java™ object 110 with the results of this deserialization (Step 506). Remember that the readXXX( ) methods of SQLObjectInputStream can read data in the ObjectStream format.

Figure 5B:
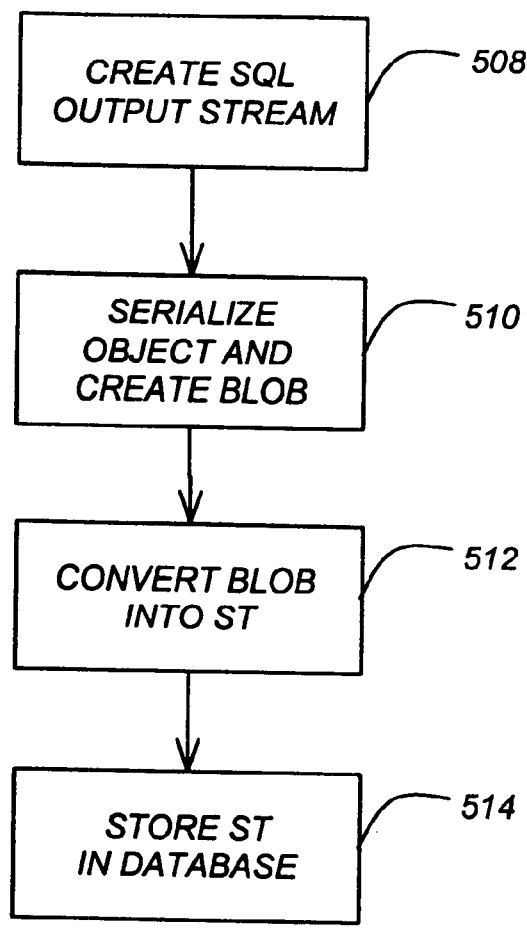

FIG. 5B is a flowchart that illustrates the logic performed during bind-in according to the preferred embodiment of the present invention. During bind-in, the reverse of bind-out takes place, with the JDBC driver 112 constructing a SQLObjectOutputStream object from a binary stream which has appropriate header information (Step 508), and using the Java™ serialization interface with the SQLObjectOutputStream object to write the contents of the Java™ class 110 (Step 510). The JDBC driver 112 then goes on to convert the binary stream in the SQLOutputStream into a BLOB, where the TO_SQL built-in transform function of the RDBMS 116 converts it into a structured type instance 124 (Step 512) and inserts the structured type instance 124 into the database 120 (Step 514). Again, notice that the writeXXX( ) methods of SQLObjectOutputStream are cognizant of the ObjectStream format.

The advantage of this approach is that this works even if the third party Java™ class 110 performs its own customizations or even if it implements the Externalizable interface, which allows the object to assume complete control over the contents and format of the object's serialized form. The methods of the Externalizable interface, e.g., writeExternal and readExternal, are called to save and restore the state of the object 110. When implemented by a class, they can write and read their own state using all of the methods of ObjectOutput and ObjectInput.

The disadvantage of this approach is that, for it to be practical, the third-party class 110 vendor needs to provide the structured type instance 124 type information that corresponds to each of its Java™ classes 110; otherwise, its attributes and readObject/writeObject implementations are invisible to the user. Of course, if this can be done, it would be simpler for the class 110 vendor to simply make the class 110 implement the SQLData interface.

Also, this requires the implementation of the ObjectInput and ObjectOutput interface, and a mechanism that takes care of mismatches in the object models of the JVM 108 and the RDBMS 116, such as the lack of circular references in class definitions for structured types in SQL99.

(2.2) Implement Custom Serialization so that the Java™ Classes need not Implement Serializable (2.2.1) Data Exchange Between the RDBMS And Client is in ObjectStream Format The mapping of Java™ classes 110 to structured type instances 124, and the work to be done on the server 104 side is exactly the same as in (2.1.2) above.

On the client 102 side, the Java™ Reflection API 114 is used for the JDBC driver 112 to get and set attributes of arbitrary Java™ classes 110 to be able to initialize a Java™ object 110 from an ObjectStream and vice-versa.

Figure 6A:
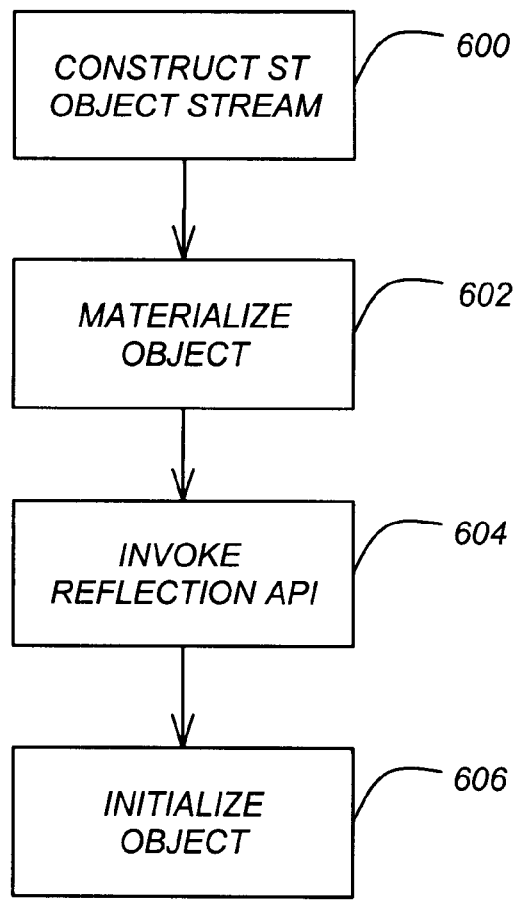

FIG. 6A is a flowchart that illustrates the logic performed during bind-in according to the preferred embodiment of the present invention. During bind-out from the RDBMS 116 to the JVM 108, the FROM_SQL built-in transform function of the RDBMS 116 constructs an ObjectStream BLOB that represents a structured type instance 124, and passes it to the JDBC driver 112 (Step 600). The JDBC driver 112 reads type information from the ObjectStream, determines that the corresponding Java™ class 110 does not implement the SQLData interface, and materializes the object 110 (Step 602). The JDBC driver 112 then calls the Java™ Reflection API 114 (Step 604), wherein the Java™ Reflection API 114 initializes the object 110 (Step 606).

Figure 6B:
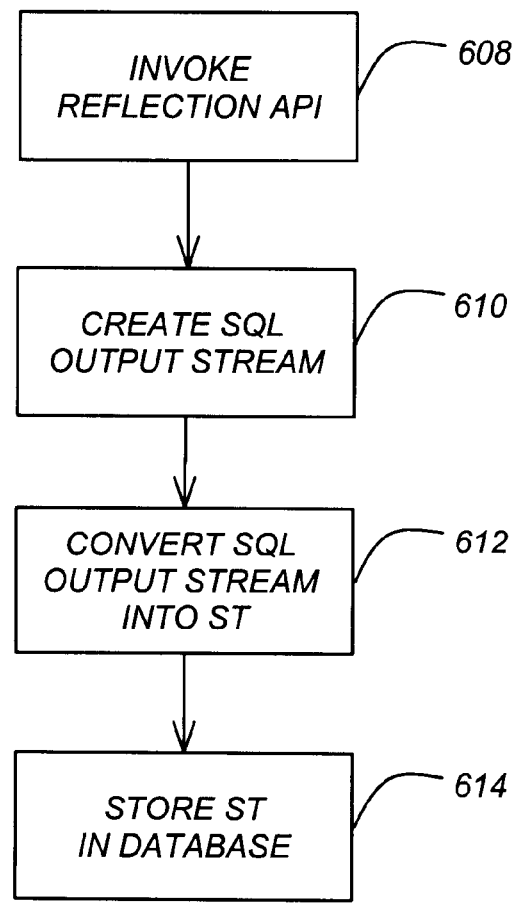

FIG. 6B is a flowchart that illustrates the logic performed during bind-in according to the preferred embodiment of the present invention. During bind-in from the JVM 108 to the RDBMS 116, the reverse from bind-out takes place, with the JDBC driver 112 invoking the Java™ Reflection API 114, wherein the Java™ Reflection API 114 retrieves the attributes of the object 110 (Step 608) to construct an SQLOutputStream (Step 610). The JDBC driver 112 then goes on to convert the SQLOutputStream into a BLOB, where the TO_SQL built-in transform function of the RDBMS 116 converts it into a structured type instance 124 (Step 612) and inserts the structured type instance 124 into the database 120 (Step 614), cognizant of the ObjectStream format. During bind-in, the developer must be aware of the possibility of circular references in the objects 110 and throw appropriate exceptions where required.

The advantage of this approach is that it works even for third party classes 110 that implement neither Serializable nor Externalizable. The disadvantage is that it requires the Java™ Reflection API 114 to be present for the JDBC driver 112. The Java™ security privilege framework of the JDK 1.2 makes it possible for the Java™ Reflection API 114 to perform these actions.

CONCLUSION

This concludes the description of the preferred embodiment of the invention. The following paragraphs describe some alternative methods of accomplishing the same objects.

In alternative embodiments of the present invention, other types and configurations of computers could be used. For example, the invention need not be restricted to client-server configurations and could be implemented on other configurations, such as a single computer, a three-tier network etc. In addition, mainframes, minicomputers, or personal computers, could be used with the present invention.

In alternative embodiments of the present invention, other types and configurations of computer programs could be used. For example, the invention need not be restricted to Java™ objects.

In alternative embodiments of the present invention, other database management systems could be used. For example, the invention need not be restricted to a relational database management system. Instead, other types of databases and datastores could be used.

In summary, the present invention discloses a method, apparatus, and article of manufacture for providing for persistence of Java™ objects. A Java™ object is instantiated from its corresponding Java™ class definition and then loaded into a Java™ virtual machine. The Java™ object may then be modified as part of execution of the program The class definition corresponding to the Java™ object can be derived using the Java™ Reflection API. Once the class definition is derived, it can be used to inspect the contents of the Java™ object. A structured type instance is then generated from the inspected contents of the Java™ object, and the structured type instance is stored in a column of a table of a relational database managed by a relational database management system. As a result of these steps, the Java™ object is persistently stored in the database, yet the persistence semantics for storing the object are not specified as part of the class definition of the object, which means that the persistence semantics are orthogonal to the class definition.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather bathe claims appended hereto.

What is claimed is:

1. A method for providing for persistence of objects in an object-oriented computer system, comprising:

(a) instantiating an object from a class definition and loading the object into a computer program executed by the computer system, wherein the object may be modified in the computer program; and (b) storing the object in a database connected to the computer, so that the object persists beyond the execution of the computer program, wherein persistence semantics for storing the object are not specified as part of the class definition.

2. The method of claim 1, wherein the persistence semantics are orthogonal to the class definition.

3. The method of claim 1, wherein the storing step comprises:

deriving the class definition for the object; and
inspecting the contents of the object using the derived class definition.

4. The method of claim 3, wherein the object is a Java™ object.

5. The method of claim 4, wherein the deriving step comprises the step of using the Java™ Reflection Application Programming Interface (API) to derive the class definition for the object.

6. The method of claim 1, wherein the database is a relational database.

7. The method of claim 6, wherein the object is stored as a structured type instance in the relational database.

8. The method of claim 7, wherein the structured type instance is stored in a column of a table in the relational database.

9. The method of claim 7, further comprising mapping the class definition to the structured type when the class definition can be modified.

10. The method of claim 9, wherein the mapping step comprises:
invoking a writeSQL method of the class definition to write the data of the object into an instance of SQLOutputStream constructed from a binary stream;
converting the binary stream in the SQLOutputStream instance into a binary large object (BLOB); and
converting the BLOB into a structured type instance and storing the instance into the database.

11. The method of claim 10, further comprising mapping the structured type to the class definition when the class definition can be modified.

12. The method of claim 11, wherein the mapping step comprises:
defining a structured type instance for each class definition, so that each attribute of the class definition has a corresponding attribute in the structured type instance;
constructing an ObjectStream Binary Large Object (BLOB) that represents a structured type instance;
reading type information from the ObjectStream to materialize the object from its corresponding class definition;
constructing an SQLInputStream instance from a remaining portion of the ObjectStream, and
calling the class definition's readSQL method to initialize the object from the SQLInputStream.

13. The method of claim 7, further comprising mapping the object to the structured type instance when the class definition cannot be modified and does not implement a SQLData interface.

14. The method of claim 13, wherein the mapping step comprises:
serializing the object's contents and storing the serialized contents as a BLOB in the database; and
mapping the class definition to a structured type instance.

15. The method of claim 14, further comprising mapping the structured type instance to the object when the class definition cannot be modified and does not implement the SQLData interface.

16. The method of claim 15, wherein the mapping step comprises:
constructing an ObjectStream from the structured type instance that maps the class definition;
reading type information from the ObjectStream to materialize the appropriate class definition as an object, and
using deserialization on an ObjectInputStream representing the BLOB to initialize the attributes of the object.

17. The method of claim 16, wherein the ObjectStream indicates the format of the structured type instance.

18. The method of claim 15, wherein the mapping step comprises:
creating an ObjectStream Binary Large Object (BLOB) with appropriate headers;
using serialization on an ObjectOutputStream that creates a content BLOB;
writing the content BLOB into the ObjectStream BLOB;
converting the ObjectStream BLOB into a structured type instance; and
storing the structured type instance in the database.

19. The method of claim 7, further comprising mapping the object to a structured type instance using a data exchange with a relational database system.

20. The method of claim 19, wherein the mapping step comprises:
constructing an ObjectStream BLOB that represents a structured type instance;
reading type information from the ObjectStream,
determining that the corresponding class does not implement a SQLData interface,
constructing a SQLInputStream instance from the ObjectStream BLOB, and
deserializing the SQLInputStream instance to initialize the object instantiated from the class definition.

21. The method of claim 20, wherein the mapping step comprises:
constructing a SQLOutputStream instance that wrappers a binary stream,
converting the SQLOutputStream instance into a BLOB;
converting the BLOB to a structured type instance;
inserting the structured type instance into the database.

22. The method of claim 7, further comprising mapping the object to a structured type instance using serialization when the class definitions do not implement serialization.

23. The method of claim 22, wherein the mapping step comprises:
retrieving attributes of a class definition in order to initialize an object from an ObjectStream.

24. The method of claim 23, wherein the mapping step comprises:
setting attributes of the class definition in order to initialize an ObjectStream from an object.

25. The method of claim 24, wherein the mapping step comprises:
constructing an ObjectStream BLOB that represents a structured type instance;
reading type information from the ObjectStream to determine that the corresponding class definition does not implement the SQLData interface, and then materializing the object from the class definition; and
invoking one or more methods to initialize the object.

26. The method of claim 25, wherein the mapping step comprises:
retrieving one or more attributes of the object to construct an SQLOutputStream,
converting the SQLOutputStream into a BLOB;
converting the BLOB into a structured type instance; and
inserting the structured type instance into the database.

27. A computerized apparatus for providing for persistence of objects in an object-oriented computer system, comprising:
(a) a computer system;
(b) logic, performed by the computer system, for:
(1) instantiating an object from a class definition and loading the object into a computer program executed by the computer system, wherein the object may be modified in the computer program; and
(2) storing the object in a database connected to the computer, so that the object persists beyond the execution of the computer program, wherein persistence semantics for storing the object are not specified as part of the class definition.

28. The system of claim 27, wherein the persistence semantics are orthogonal to the class definition.

29. The system of claim 27, wherein the logic for storing comprises logic for:
   deriving the class definition for the object; and
   inspecting the contents of the object using the derived class definition.

30. The system of claim 29, wherein the object is a Java™ object.

31. The system of claim 30, wherein the logic for deriving comprises logic for using the Java™ Reflection Application Programming Interface (API) to derive the class definition for the object.

32. The system of claim 27, wherein the database is a relational database.

33. The system of claim 32, wherein the object is stored as a structured type instance in the relational database.

34. The system of claim 33, wherein the structured type instance is stored in a column of a table in the relational database.

35. The system of claim 33, further comprising logic for mapping the class definition to the structured type when the class definition can be modified.

36. The system of claim 35, wherein the logic for mapping comprises logic for:
   invoking a writeSQL method of the class definition to write the data of the object into an instance of SQLOutputStream constructed from a binary stream;
   converting the binary stream in the SQLOutputStream instance into a binary large object (BLOB); and
   converting the BLOB into a structured type instance and storing the instance into the database.

37. The system of claim 36, further comprising logic for mapping the structured type to the class definition when the class definition can be modified.

38. The system of claim 37, wherein the logic for mapping comprises logic for:
   defining a structured type instance for each class definition, so that each attribute of the class definition has a corresponding attribute in the structured type instance;
   constructing an ObjectStream Binary Large Object (BLOB) that represents a structured type instance;
   reading type information from the ObjectStream to materialize the object from its corresponding class definition;
   constructing an SQLInputStream instance from a remaining portion of the ObjectStream, and
   calling the class definition's readSQL method to initialize the object from the SQLInputStream.

39. The system of claim 33, further comprising logic for mapping the object to the structured type instance when the class definition cannot be modified and does not implement a SQLData interface.

40. The system of claim 39, wherein the logic for mapping comprises logic for:
   serializing the object's contents and storing the serialized contents as a BLOB in the database; and
   mapping the class definition to a structured type instance.

41. The system of claim 40, further comprising logic for mapping the structured type instance to the object when the class definition cannot be modified and does not implement the SQLData interface.

42. The system of claim 41, wherein the logic for mapping comprises logic for:
   constructing an ObjectStream from the structured type instance that maps the class definition;
   reading type information from the ObjectStream to materialize the appropriate class definition as an object, and
   using deserialization on an ObjectInputStream representing the BLOB to initialize the attributes of the object.

43. The system of claim 42, wherein the ObjectStream indicates the format of the structured type instance.

44. The system of claim 41, wherein the logic for mapping comprises logic for:
   creating an ObjectStream Binary Large Object (BLOB) with appropriate headers;
   using serialization on an ObjectOutputStream that creates a content BLOB;
   writing the content BLOB into the ObjectStream BLOB;
   converting the ObjectStream BLOB into a structured type instance; and
   storing the structured type instance in the database.

45. The system of claim 33, further comprising logic for mapping the object to a structured type instance using a data exchange with a relational database system.

46. The system of claim 45, wherein the logic for mapping comprises logic for:
   constructing an ObjectStream BLOB that represents a structured type instance;
   reading type information from the ObjectStream,
   determining that the corresponding class does not implement a SQLData interface,
   constructing a SQLInputStream instance from the ObjectStream BLOB, and
   deserializing the SQLInputStream instance to initialize the object instantiated from the class definition.

47. The system of claim 46, wherein the logic for mapping comprises logic for:
   constructing a SQLOutputStream instance that wrappers a binary stream,
   converting the SQLOutputStream instance into a BLOB;
   converting the BLOB to a structured type instance;
   inserting the structured type instance into the database.

48. The system of claim 33, further comprising logic for mapping the object to a structured type instance using serialization when the class definitions do not implement serialization.

49. The system of claim 48, wherein the logic for mapping comprises logic for:
   retrieving attributes of a class definition in order to initialize an object from an ObjectStream.

50. The system of claim 49, wherein the logic for mapping comprises logic for:
   setting attributes of the class definition in order to initialize an ObjectStream from an object.

51. The system of claim 50, wherein the logic for mapping comprises logic for:
   constructing an ObjectStream BLOB that represents a structured type instance;
   reading type information from the ObjectStream to determine that the corresponding class definition does not implement the SQLData interface, and then materializing the object from the class definition; and
   invoking one or more methods to initialize the object.

52. The system of claim 51, wherein the logic for mapping comprises logic for:

retrieving one or more attributes of the object to construct an SQLOutputStream, converting the SQLOutputStream into a BLOB;

converting the BLOB into a structured type instance; and inserting the structured type instance into the database.

53. An article of manufacture embodying logic of a method for providing for persistence of objects in an object-oriented computer system, the method comprising:

(a) instantiating an object from a class definition and loading the object into a computer program executed by the computer system, wherein the object may be modified in the computer program; and (b) storing the object in a database connected to the computer, so that the object persists beyond the execution of the computer program, wherein persistence semantics for storing the object ate not specified as part of the class definition.

54. The method of claim 53, wherein the persistence semantics are orthogonal to the class definition.

55. The method of claim 53, wherein the storing step comprises:

deriving the class definition for the object; and inspecting the contents of the object using the derived class definition.

56. The method of claim 55, wherein the object is a Java™ object.

57. The method of claim 56, wherein the deriving step comprises the step of using the Java™ Reflection Application Programming Interface (API) to derive the class definition for the object.

58. The method of claim 53, wherein the database is a relational database.

59. The method of claim 58, wherein the object is stored as a structured type instance in the relational database.

60. The method of claim 59, wherein the structured type instance is stored in a column of a table in the relational database.

61. The method of claim 59, further comprising mapping the class definition to the structured type when the class definition can be modified.

62. The method of claim 61, wherein the mapping step comprises:

invoking a writeSQL method of the class definition to write the data of the object into an instance of SQLOutputStream constructed from a binary stream;

converting the binary stream in the SQLOutputStream instance into a binary large object (BLOB); and converting the BLOB into a structured type instance and storing the instance into the database.

63. The method of claim 62, further comprising mapping the structured type to the class definition when the class definition can be modified.

64. The method of claim 63, wherein the mapping step comprises:

defining a structured type instance for each class definition, so that each attribute of the class definition has a corresponding attribute in the structured type instance;

constructing an ObjectStream Binary Large Object (BLOB) that represents a structured type instance;

reading type information from the ObjectStream to materialize the object from its corresponding class definition;

constructing an SQLInputStream instance from a remaining portion of the ObjectStream, and calling the class definition's readSQL method to initialize the object from the SQLInputStream.

65. The method of claim 59, further comprising mapping the object to the structured type instance when the class definition cannot be modified and does not implement a SQLData interface.

66. The method of claim 65, wherein the mapping step comprises:

serializing the object's contents and storing the serialized contents as a BLOB in the database; and mapping the class definition to a structured type instance.

67. The method of claim 66, further comprising mapping the structured type instance to the object when the class definition cannot be modified and does not implement the SQLData interface.

68. The method of claim 67, wherein the mapping step comprises:

constructing an ObjectStream from the structured type instance that maps the class definition;

reading type information from the ObjectStream to materialize the appropriate class definition as an object, and using deserialization on an ObjectInputStream representing the BLOB to initialize the attributes of the object.

69. The method of claim 68, wherein the ObjectStream indicates the format of the structured type instance.

70. The method of claim 67, wherein the mapping step comprises:

creating an ObjectStream Binary Large Object (BLOB) with appropriate headers;

using serialization on an ObjectOutputStream that creates a content BLOB;

writing the content BLOB into the ObjectStream BLOB;

converting the ObjectStream BLOB into a structured type instance; and storing the structured type instance in the database.

71. The method of claim 59, further comprising mapping the object to a structured type instance using a data exchange with a relational database system.

72. The method of claim 71, wherein the mapping step comprises:

constructing an ObjectStream BLOB that represents a structured type instance;

reading type information from the ObjectStream, determining that the corresponding class does not implement a SQLData interface, constructing a SQLInputStream instance from the ObjectStream BLOB, and deserializing the SQLInputStream instance to initialize the object instantiated from the class definition.

73. The method of claim 72, wherein the mapping step comprises:

constructing a SQLOutputStream instance that wrappers a binary stream, converting the SQLOutputStream instance into a BLOB;

converting the BLOB to a structured type instance;

inserting the structured type instance into the database.

74. The method of claim 59, further comprising mapping the object to a structured type instance using serialization when the class definitions do not implement serialization.

75. The method of claim 74, wherein the mapping step comprises:

retrieving attributes of a class definition in order to initialize an object from an ObjectStream.

76. The method of claim 75, wherein the mapping step comprises:

setting attributes of the class definition in order to initialize an ObjectStream from an object.

77. The method of claim 76, wherein the mapping step comprises:

constructing an ObjectStream BLOB that represents a structured type instance;

reading type information from the ObjectStream to determine that the corresponding class definition does not implement the SQLData interface, and then materializing the object from the class definition; and invoking one or more methods to initialize the object.

78. The method of claim 76, wherein the mapping step comprises:

retrieving one or more attributes of the object to construct an SQLOutputStream, converting the SQLOutputStream into a BLOB;

converting the BLOB into a structured type instance; and inserting the structured type instance into the database.

* * * * *